(12) United States Patent
Williams (10) Patent No.: US 11,725,408 B2
(45) Date of Patent: Aug. 15, 2023

(54) INTELLIGENT SOLAR AWARE LOAD CONTROLLER

(71) Applicant: John Williams, Chesapeake, VA (US)

(72) Inventor: John Williams, Chesapeake, VA (US)

(*) Notice: Subject to any disclaimer, the term of this patent is extended or adjusted under 35 U.S.C. 154(b) by 184 days.

(21) Appl. No.: 17/305,084

(22) Filed: Jun. 30, 2021

(65) Prior Publication Data

US 2021/0404200 A1 Dec. 30, 2021

Related U.S. Application Data

(60) Provisional application No. 62/705,508, filed on Jun. 30, 2020.

(51) Int. Cl.
| | |
|---|---|
| *E04H 4/12* | (2006.01) |
| *H02J 3/38* | (2006.01) |
| *H02J 3/00* | (2006.01) |
| *F04B 17/03* | (2006.01) |
| *F04B 17/00* | (2006.01) |

(52) U.S. Cl.
CPC ........... *E04H 4/129* (2013.01); *E04H 4/1209* (2013.01); *F04B 17/006* (2013.01); *F04B 17/03* (2013.01); *H02J 3/0075* (2020.01); *H02J 3/381* (2013.01); *H02J 2300/24* (2020.01)

(58) Field of Classification Search
CPC ..... E04H 4/129; E04H 4/1209; F04B 17/006; F04B 17/03; H02J 3/0075; H02J 3/381; H02J 2300/24; Y02E 10/56; Y02P 80/20
USPC .......................................................... 307/52
See application file for complete search history.

(56) References Cited

U.S. PATENT DOCUMENTS

2020/0395759 A1* 12/2020 Osborne ................. H02J 1/14
2022/0393500 A1* 12/2022 Baptista De Lima .... H02J 3/38

* cited by examiner

*Primary Examiner* — Richard Tan
(74) *Attorney, Agent, or Firm* — Law Office of Scott C Harris (57) ABSTRACT

A hybrid solar load controller. The controller determines values to carry out what is referred to herein as "best effort" pumping during sun hours, understand its progress, and then "finish the job" with AC power after sun hours have concluded, while taking fullest advantage of pump affinity when on paid-power pump. In embodiments, the pump can be a water pump for a pool, and a goal can be set as a total volumetric goal. The goal can also be a fill level for a container.

20 Claims, 9 Drawing Sheets

INTELLIGENT SOLAR AWARE LOAD CONTROLLER

This application claims priority from provisional application No. 62/705,508, filed Jun. 30, 2020, the entire contents of which are herewith incorporated by reference.

BACKGROUND

In the aquatics industry, such as the spa and swimming pool industry, pumps are used to power filtration systems, robotic devices, and to operate water jets or other water features. The current state of the art of aquatics pump and pump power technology provides several available options.

Single speed pumps operate on a fixed AC input and deliver fixed speed operation when powered. These pumps are either on or off. They can be operated from a timer, or power switch, or allowed to run continuously. These pumps have no selectivity in their pumping.

Two-speed pumps have the addition of a control, e.g., a switch, to select between a high/low pump speed setting.

Variable speed pumps employ a variable frequency drive (VFD), or variable speed drive (VSD) drive. This allows a controller to be programmed to run a program for operating the pump at different speeds that are set as needed based on the specific aquatic requirements. This is typically done by varying the frequency of an inverter feeding power to the motor of the pump. VSD/VFD pumps allow a controller to select from several predefined programs, each having a different pre-set speed set by RPM or frequency. By switching to a different pump speed, this allows the pump to electronically change its performance. For example, a program may increase the speed of the pump in order to carry out heating, chilling, water treatment, or cleaning of the pool.

A "default" program is selected by the pump owner or installer and may be calculated based on a head calculation along with the pump manufacturer's head curve, or more commonly, estimated based on experience. In spite of a variable speed capability, each VFD/VSD "power step" program operates at a single fixed speed when active. Therefore selecting between multiple programs approximates the control capabilities of a multi-speed pump. In many VSD applications, only a single program is used, negating potential efficiency advantages that could be gained compared to a properly sized single speed pump.

Solar pool pumps use maximum power point tracking or MPPT circuits, similar to those used in a solar charge controller. These are connected to solar panels, and to an inverter, and track the maximum solar power point to operate such that as the sun strength is strong, the inverter output frequency rises and pump runs faster. Conversely, when the sun is weaker, frequency is reduced and the pump runs slower. Some solar pumps have the ability to use AC input power as a "backup" by AC source rectification to DC power such that the AC-derived DC power is processed in a similar manner as if it were originally sourced from solar power.

In the surface and submersible water pump industry, as applied to irrigation or water supply pumping, the same type pump motors as described above may be used, divided further by type. Submersible pumps are typically used for deep wells requiring higher lift, while surface pumps may be used to transport water from a pond or river, to or between tanks, or to a pressurized system for further transport or consumption, where elevation differences and lift are lower. These pumps are typically operated in the same control manner as described above, i.e. single speed, multi-speed, variable speed, or solar type, and are typically enabled/disabled based on an external input or switch connected to a pressure sensor or tank level sensor.

In the current solar pump market, solar pump inverters have been developed to operate pumps and other motors by using MPPT tracking and allowing the inverter to directly power pumps such that a 3-phase AC pump motor or permanent magnet synchronous pump motor can operate at a "best effort" speed based on available solar energy, for example, when the sun conditions are good, the motor runs faster, when sun strength is weaker, the motor runs slower. This technology has been applied to irrigation pumps, water supply pumps, pool pumps, and other similar water or fluid pumps. Some solar pump systems have the ability to be switched to an AC input for use when solar power is not available.

Current solar pump technology typically uses "best effort". This is less costly to operate due to free solar energy. However, this kind of pump does not have optimized efficiency when used with an AC backup. When used along with AC backup, this pump will run at full speed at all times since they sense an apparently unlimited source of DC power.

SUMMARY OF THE INVENTION

The inventor recognized, a number of drawbacks with the current systems.

Todays solar pump systems cannot be easily used on pools that include automation or equipment that, when activated, have a higher flow rate requirement, such as may be the case with robotics, water features, pool heaters, or others. When powered by solar power, such higher speed may be higher than can be provided at the moment based on the available sun energy. These speed increases may not be possible unless AC backup is used, since there is no guarantee that the solar strength at the time needed will be enough. However, when AC backup is enabled, the pump runs at its full speed rather than a calculated minimum speed for best efficiency.

Pool and water sanitation, heating, among other ancillary loads, often need power which in many cases cannot be provided by a solar pump inverter, or if so, not in an efficient manner.

Embodiments describe a device and method for operating an intelligent control of pumps using an analysis of the needed flow, the available solar power and any future needs to determine how to most effectively use solar power.

Embodiments describe the pumps being fluid pumps, such as water pumps and compressors. Embodiments describe driving external supplemental loads using the intelligence in the control system to optimize use of solar energy.

DETAILED DESCRIPTION

Embodiments describe an optimized hybrid solar inverter system which operates using 3-phase or permanent magnet pump motors by outputting power derived from a solar and/or AC backup power input, in a highly efficient manner and taking advantage of pump affinity laws.

Other embodiments can operate with single phase AC power.

Embodiments have the ability to dynamically blend solar-DC power with AC-derived backup DC power in a most efficient way. Solar DC is used first, in its entirety, as the primary source of power, and best effort operation of the loads is carried out during a time when solar energy is available, in embodiments. Power blending technology is used to include other sources of power, along with the solar power.

Unique features of the system include the optimized use of any AC power being used, limiting the amount of paid-energy (AC energy input) required, and in the ability of the system controller, to accept a user-defined volumetric time period pumping goal, for example, total gallons that must be pumped per day (eg. to properly filter a swimming pool). This volumetric goal is used to measure the volume pumped during the period of solar availability, and to determine a speed needed to complete the volumetric goal during a remaining pumping time period. For example, this determine the time remaining until the beginning of the next period of expected solar availability, and modulate its speed/power draw to the minimal level needed to meet any such volumetric goal.

Figure 1:
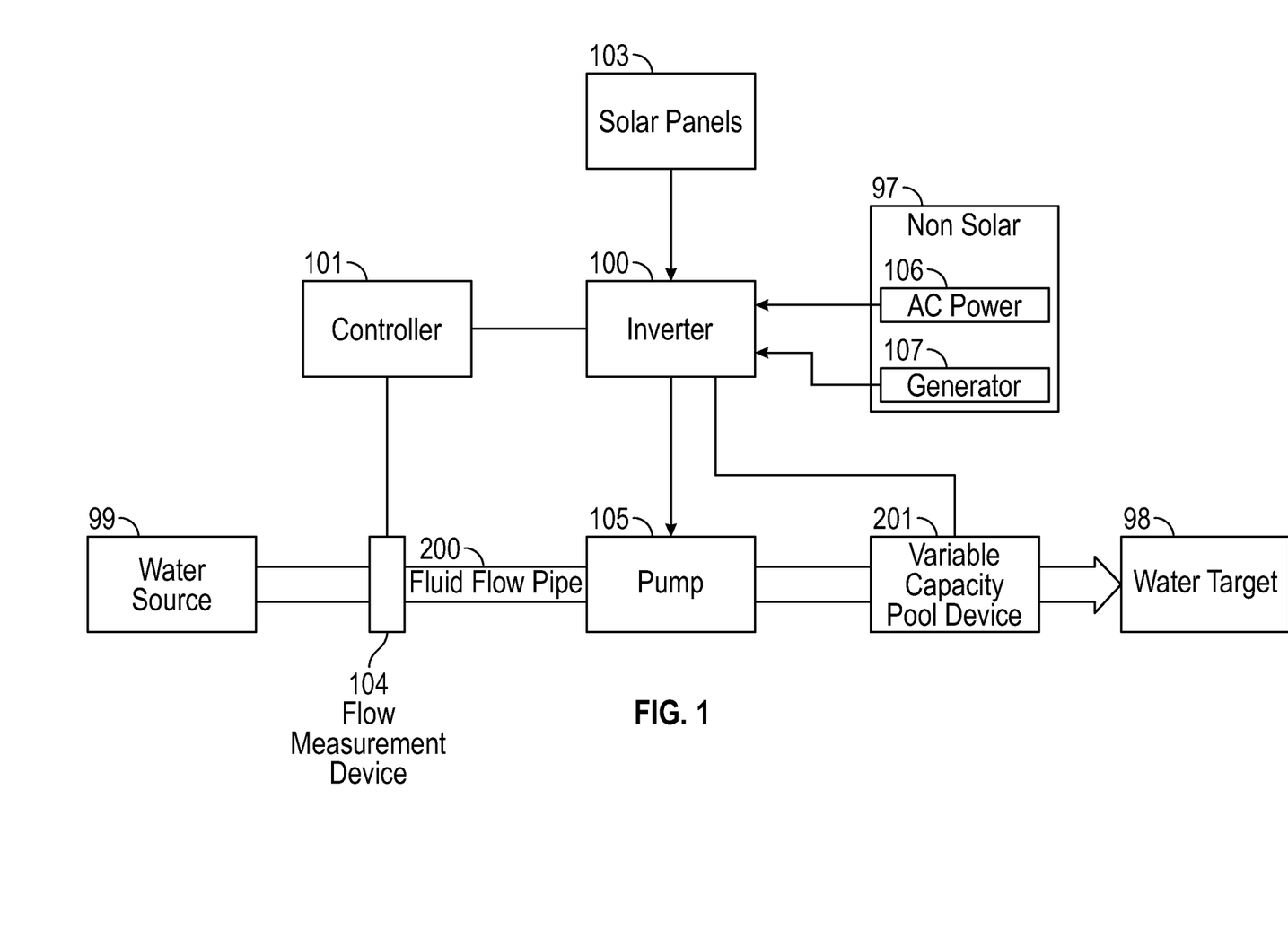
FIG. 1 shows an embodiment to use best effort pumping to maintain a volumetric goal per unit time.

FIG. 1 shows a first embodiment in which a volumetric goal is met in a most efficient way. One or more solar panels 103 connect to an inverter 100, which produces AC power 150 that is itself used to drive a pump 105. The inverter is controlled by an inverter controller 101. The inverter controller can also include a system controller that controls the components according to the flowchart of FIG. 1B. In another embodiment, the inverter controller and system controller can be separate devices.

In this embodiment, a pump 105 receives water from a water source 99, and pumps the water to a water target 98 via a fluid flow supplied pipe 200. The water is pumped in the direction of the arrow. The water may be, for example, recirculating water whereby the water source 99 is a pool and the water target 98 is the same pool. The amount of water flow is measured by a fluid measurement device 104. The measurement from the fluid flow measurement device 104 is communicated to system controller 101, which operates as described herein.

The inverter may also receive power from the non-solar source 97, which may include the AC mains 106 and/or from a generator 107.

Figure 1B:
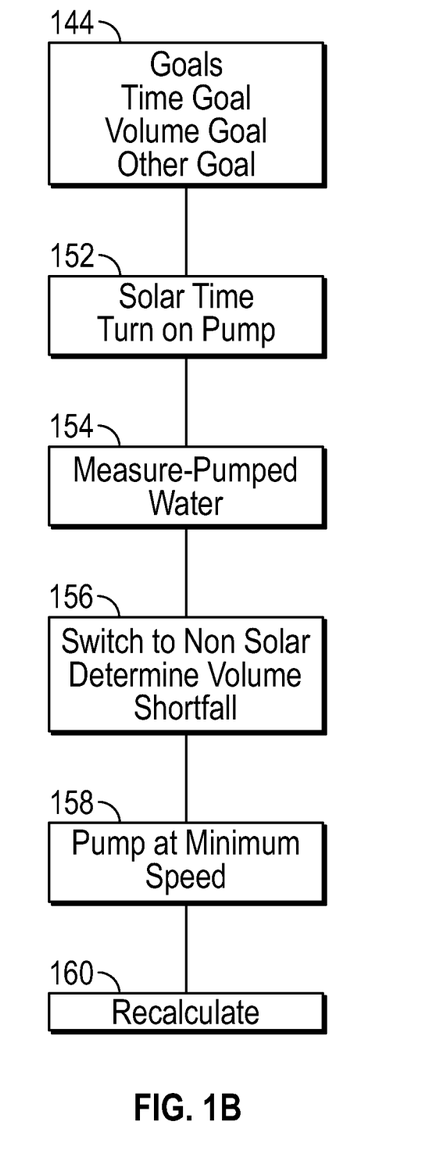
FIG. 1B shows of a flowchart of operation of the system of FIG. 1.

In operation, the controller 101 controls the operation is described herein, and as shown in the flowchart of FIG. 1B.

An initial operation starts by setting different details associated with the solar operation at 144. Goals are set. A time period goal may be set by a user, or may be automatically determined. This is the time during which the solar energy is will be sufficiently high as to be able to operate the pool pump. This may be automatically determined for example from a weather chart or from other information, or may set by a user, for example between 10 AM and 2 PM. Other goals can also be set at 149, including a volume goal, which is the total volume required to be filtered per day for the pool. For example, this can be set based on the size of the pool, to set a 3 times pool volume water turnover per day in one example. This can also be set to a higher level during warmer water temperatures and a lower level during cooler water temperatures.

Other goals are described in other embodiments.

In another embodiment, the system can monitor the solar output, to determine when the solar output is sufficiently high to operate the pump, and use that in place of the goal time.

The pump is turned on during the goal time at 152. During the time the water is pumping, the flow sensor 104 determines the total volume of water that has been pumped via solar power at 154.

At the end of solar-hours at 156, the system switches to the non-solar power input from 97, and determines the volume shortfall. The volume shortfall is determined using the volume that was measured at 154, and subtracting that from the total volume goal that was set as part of 150. The results of this calculation becomes the shortfall, which is the remaining amount of volume that needs to be pumped from the AC mains power.

If a shortfall exists, the controller 101 determines a required flow rate target at 158 such that the pump speed is the minimum speed needed to complete the goal within the allotted time. The allotted time, for example, can be the time until the next time period/goal begins, or can be a time that is set by a user, for example requesting the AC power to be used during off-peak hours (between 1 AM and 5 AM for example) or before 6 PM to avoid noise from the pool filter during night hours.

In embodiments, as the system operates, the controller can perform re-calculations of volume pumped vs. any such volumetric goal, divided by remaining time in the goal period, and dynamically reset the flow rate target as needed to compensate for any variance that may have occurred as a result of external factors, at 160. Variances of this type requiring speed or flow rate adjustment may result from changes in head pressure of the system, a change in utility supplied voltage applied to the rectifier input, a change in valve position, or other factors which may include but not be limited to a change in the operating temperature of the inverter or pump motor, changes to ambient air or fluid temperature or pressure, or other such parameters. A first temperature sensor 162 may test the temperature of the hardware. There can also be water temperature sensors including sensor 108 which tests the water temperature before the pump and sensor 109 which test the water temperature after the pump.

An important feature of the present invention is that of maximizing energy savings available from pump affinity characteristics. As pump speed is minimized, pump input power is also reduced. Also, in general, these pumps run more efficiently at lower speeds, and get more pumping energy per kilowatt hour at lower speeds. Hence, by calculating, and recalculating as needed, and operating the pump at the minimum possible speed, the system optimizes its use of AC power by taking maximum advantage of pump affinity laws, where flow is proportional to the pump shaft RPM, where RPM is proportional to input power, and where a small reduction in pump shaft RPM results in a large energy savings. For example, doubling a pump's speed/flow uses eight times ($2^3$) more power. Therefore, cutting the speed in half uses only one-eighth ($0.5^3$) the power to run the pump. Thus, when pumping with paid or partly paid-energy (AC input), the system targets the highest possible electro-hydrodynamic efficiency (and therefore, economic efficiency) by operating at the lowest speed, one that equals and does not exceed the flow requirement need to meet a volumetric goal within a defined time period.

Thus, in this embodiment, the system determines values to carry out what is referred to herein as "best effort" pumping during sun hours, understand its progress, and then "finish the job" with AC power after sun hours have concluded, while taking fullest advantage of pump affinity when on paid-power. The system can satisfy a volumetric goal by calculating a minimum speed/target flow rate of the pump needed to complete the required pumping volume using the full amount of allotted time, operating at the calculated speed, measure its actual volumetric performance along the way, and recalculate and reset a target pump speed or flow rate as needed.

Figure 2:
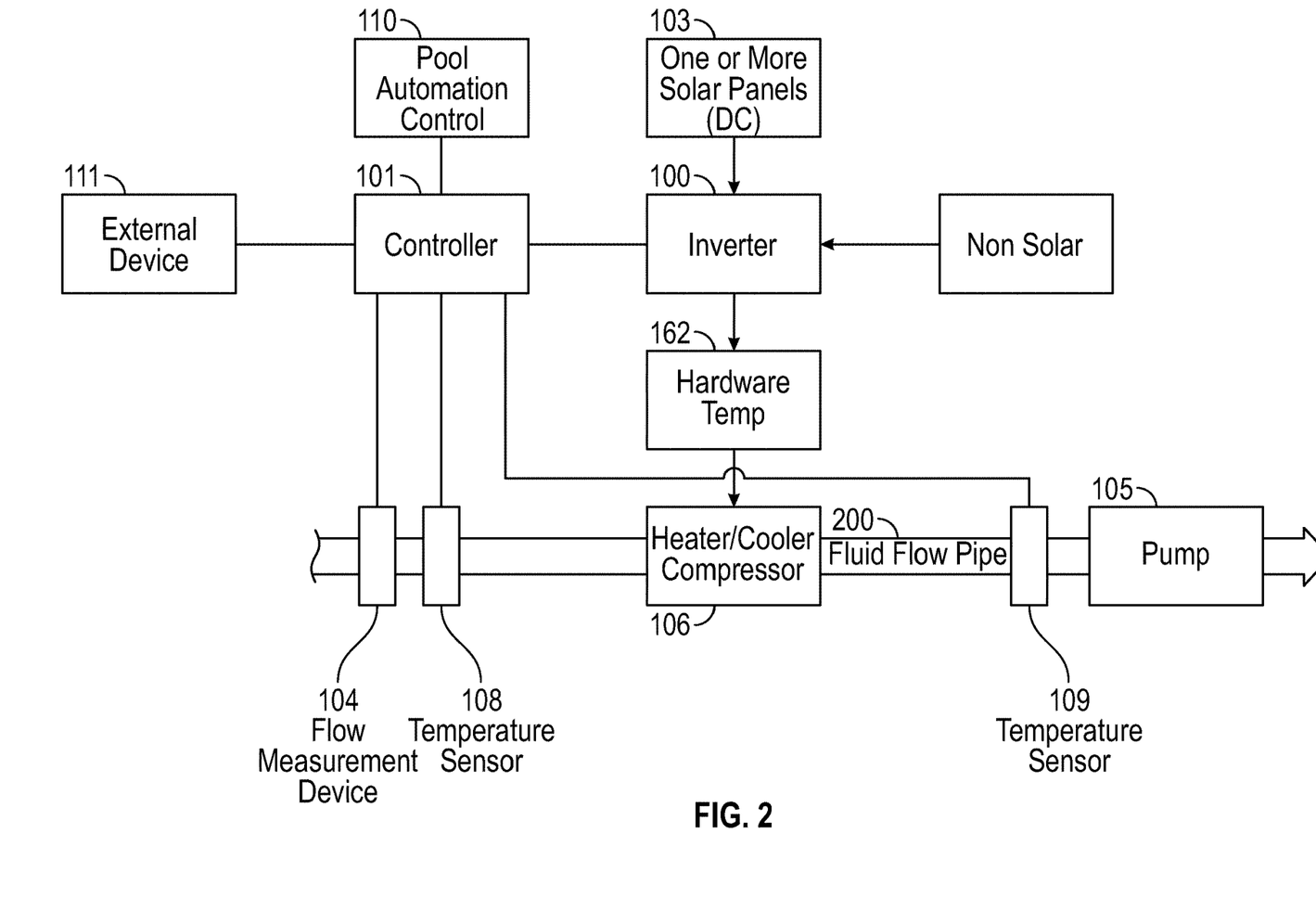
FIG. 2. shows an embodiment which adds an ancillary device to be powered.

In another embodiment, shown in FIG. 2, the inverter 100 can also power ancillary loads, e.g., a variable power arrangement. In FIG. 2, a single phase pool heater or cooler 106 is added. One or two optional temperature sensors 108,109 are connected to pipe 200 and provide temperature output to controller 101. The pool heater/cooler 106 is also fed its power from inverter 100. The controller 101 detects the available amount of solar power, and operates to dynamically adjust the power of the ancillary device 106, and provide the remaining power to the pump 105. The amount of power to the ancillary device 106 can be either set by a user as part of the goal setting at 149, or dynamically adjusted based on the amount of power available from the solar panels 103.

Another unique aspect of the system is its ability to modulate the use of AC power during hybrid AC-DC operation. When any AC power is being used, the system has the ability to control the pump to a specific speed, regardless of the percentage of solar or AC contribution, to meet any application-specific required speed, even when using solar or solar+ AC input. Since solar energy is free, and contributes to the volumetric goal, the most common configuration would be to always use all of the free solar energy, when solar is the only power input, and pump as much volume as possible without regards to affinity laws. The system may generally disallow the input of AC power input when solar is available, but may allow a specified amount of AC input during solar hours in response to time period volumetric goals and calculations. In an embodiment, AC input may be allowed and controlled ad-hoc based on input from an external system, for example, to satisfy an external demand, or based on user-defined timers, schedules, programmable logic, operating conditions, or other desired features.

A pool automation controller 110 and at least one other optional pool device 111 can also be connected to controller 101.

The pump 106 can, in embodiments, be a variable capacity pool device. There can also optionally be a separate variable capacity power pool device 201 which is also controlled by the controller, and receives its power from the inverter 100

Figure 3:
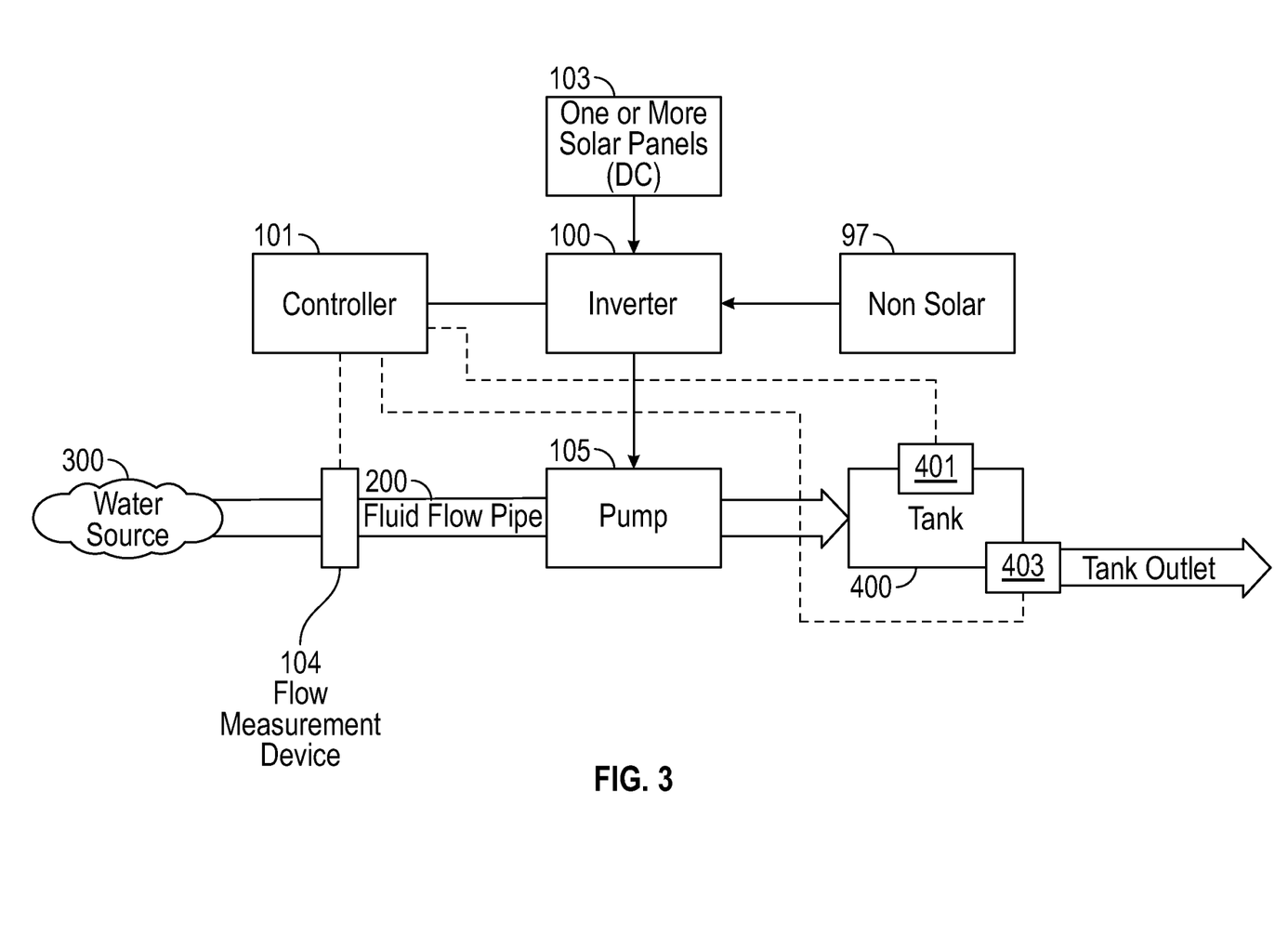
FIG. 3 shows an embodiment where the system is used to keep a tank at a specified water level.

FIG. 3 shows an embodiment where water from water source 300 (which may be a well, river, pond, or another tank, or similar source) is pumped into tank 400. A tank fill level sensor 401 is associated with tank 400 and connected to and controlled by controller 101. The fill level sensor 401 can be a float type, ultrasonic transducer, conductivity sensor, pressure sensor, or other type sensor capable of measuring the fill level of tank 400.

This embodiment can use the best effort techniques of this system for a water supply storage application. In this embodiment, the goal is a volumetric goal is a target to either fill, or keep a tank filled, to a certain level, such target level during specified by time period or by a certain time. For example, a goal may be to keep a tank full during solar power hours, but at night, when using only AC input, a secondary goal of the tank being only ½ full could be maintained.

In this embodiment, the tank level measurement may be used to calculate and quantify the after-solar-hours (AC input operation period) pumping requirement. As in the first embodiment, in order to take advantage of pump affinity, the system controller can manage the pump to operate at the lowest possible speed that will complete the goal within the allotted time frame.

Another layer of control can also monitor goal progress between various tank levels. This can use a second flow meter to quantify any consumption load or outflow usage of the tank that occurs during the filling operation, and based on that information, recalculate in real time a new minimum pump speed target needed to meet the fill level goal according to the allowed time frame.

In one embodiment, a water flow sensor 403 can be added to the leaving water tank outlet 402 and connected to controller 101. The water flow sensor can also be used to determine, for example, an amount of necessary pumping. In an embodiment, additional pumping may be requested when the rate of water output through the flow level sensor goes above a specified level.

Figure 4:
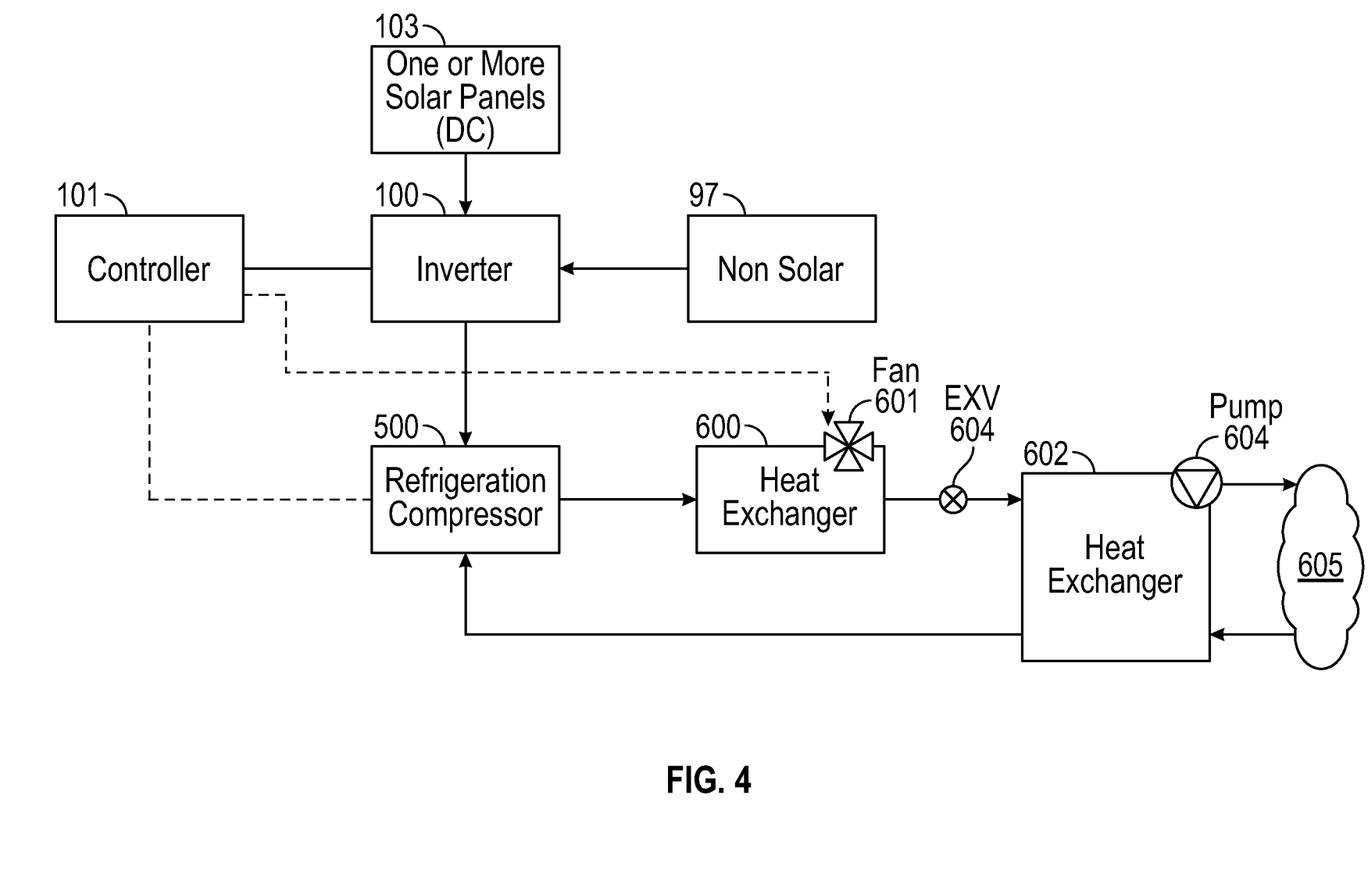
FIG. 4 shows an embodiment where a refrigeration system is controlled using the best effort during solar control system as described herein.

While the system technology is primarily applicable to powering and controlling water pumps, other embodiments may also be applied to powering motor driving. FIG. 4 shows an embodiment where a refrigeration/heating compressor 500, a heat exchanger part, e.g., condenser 600, a condenser fan 601, an other heat exchanger part, e.g., evaporator 602, an evaporator fan 603, expansion valve 604 are used together to create a generic refrigeration system. This embodiment contemplates that the arrangement of elements 500, 600, 601, 602 can be rearranged so that in addition to refrigerated of cooling, they can also create a fluid heating system used to heat a storage tank or supply heated fluid to a load.

The best effort during solar control system as described herein is used to perform as much heating or cooling work as can be done according to the amount of available solar energy. If a defined BTU or BTU/h goal is established and cannot be not met by operating only upon solar input, the system is used to invoke AC backup operation 605 to supplement any solar energy shortfall in-line with operating and control characteristics as variously and previously described. While operating the compressor motor 500, when utilizing any AC power, the system operates at the lowest possible speed to meet any established goals. When the compressor is of the centrifugal type or variable displacement type, this can be controlled so as to maximize the efficiency according to affinity laws.

In an embodiment, the refrigeration system can be used to create chilled water or heated water for a pool system, for example.

Figure 5:
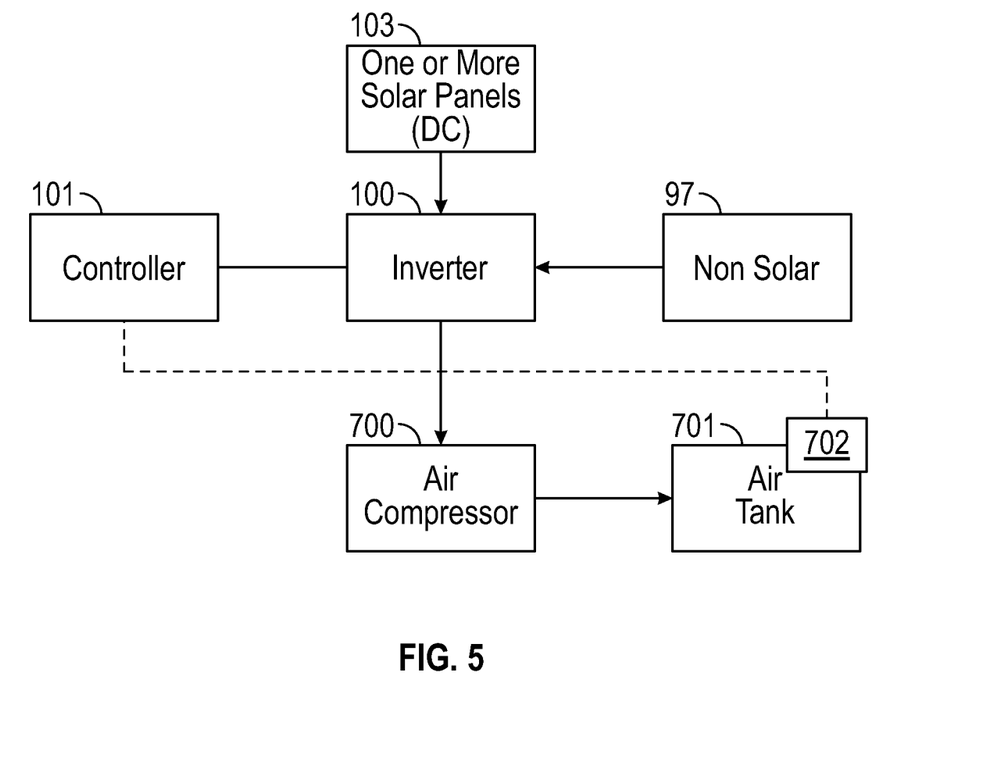
FIG. 5 shows an embodiment where a pressurized air tank has its pressure maintained according to the techniques of the present application.

Another embodiment shown in FIG. 5 uses the system to operate an air compressor 700 configured to operate with a variable speed capable motor. The compressor is configured to produce a certain system pressure in storage tank 701. This pressure in the storage tank 701 is maintained at a pressure level, detected by pressure sensor 702, using a compressor speed according to the amount of available solar energy. A pressure sensor 702 informs the system controller 101 of tank pressure and maintains that pressure. In this embodiment, the goal can be a pressure goal. The pressure goal is established as the goal established at 149.

During the time of solar input, maximum air compressor operation is carried out. If the goal cannot be met by operating only upon solar input, then AC backup operation is carried out to supplement any solar energy shortfall in-line with operating and control characteristics as variously and previously described, and while operating said compressor motor, when utilizing any AC power, operates at the lowest possible speed to meet any established goals, and when such compressor is of the centrifugal type, maximize the efficiency according to affinity laws.

Figure 6:
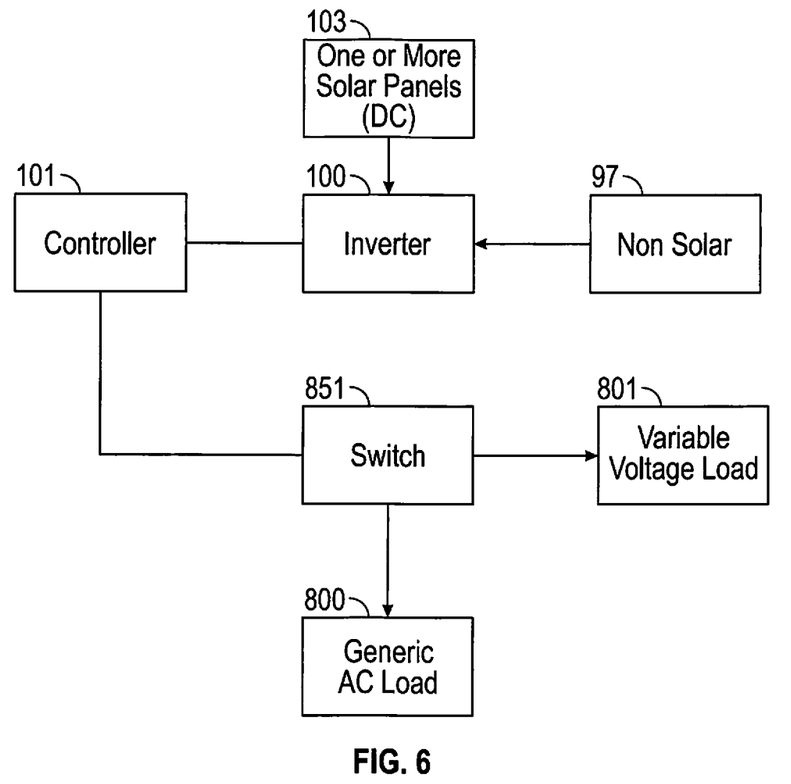
FIG. 6 shows an embodiment which powers an AC load that requires a certain input level of voltage or power.

Another embodiment, shown in FIG. 6, uses the inverter 100 to power an AC load 800 that requires a certain input level of voltage or power for its proper operation. When that power or voltage is not available to inverter 100 from solar power 103, load 800 is switched off and available power is then applied to one or more secondary load(s) 801. This secondary AC load is one that can tolerate a lower power input and does not require a certain level of voltage or power for its proper operation. This allows the solar power to be used even though that solar power may not be sufficient to power a primary load 800. Should the solar power return to a level that can support load 800, power could then be reapplied to load 800.

Figure 6A:
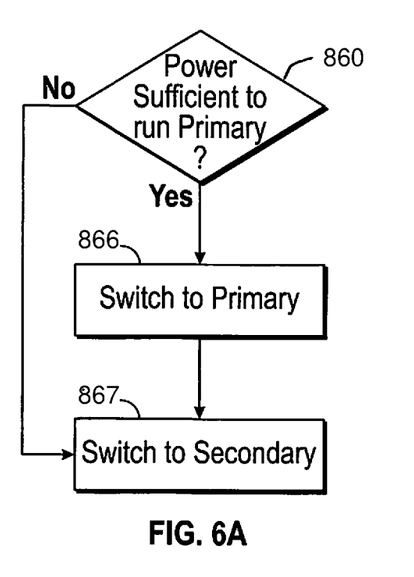
FIG. 6A shows a flowchart of operation carried out by the controller 101 to determine which load to operate.

In an embodiment, the controller controls the operation according to the flowchart of FIG. 6A. At 860, the system determines if the available power is sufficient to run the primary load 800. If so, the switching device 851 is controlled or maintained to switch below to the primary load at 866. However, if the power at 860 is determined to be below the level that can drive the primary load, this is sensed by the controller 101, which controls the switching device to automatically switch the output to the variable voltage load 801, one that can accept variable power or voltage at 867. In an embodiment, for example, the switching device can be a relay. In this case, the system may allow an AC output voltage to drop according to power draw when input power availability is constrained.

In one embodiment, the primary load 800 can be an AC motor, and a secondary load is a device such as a rectifiers, battery chargers, power adapters, devices with input voltage regulation and the like are designed to operate with variable input voltages. In another embodiment, the secondary load 801 is a heat producing device, that uses some kind of resistive or other kind of heating such as electric heater or boiler. These devices will operate at a lower voltage, but at a lower output when powered below their design rating.

Another aspect of the system of FIG. 6 uses the controller 101 to command the load 800 to reduce its speed or power draw, thus adapting this operation when the solar power becomes less prevalent.

This system may be used to supply AC power to a typical AC load or loads, or sub-panel of loads, such that the solar powered input power would be used in priority, and AC backup, if available, used as a supplement, and in a case where AC backup is not allowed or not available, and the AC load exceeds the power available from solar, to switch power output to a load that can operate from a lower or variable input of power or voltage, or, in the example of a primary load that can operate at multiple speeds or power level inputs, to signal such load equipment to reduce its speed or input power requirement.

Figure 7:
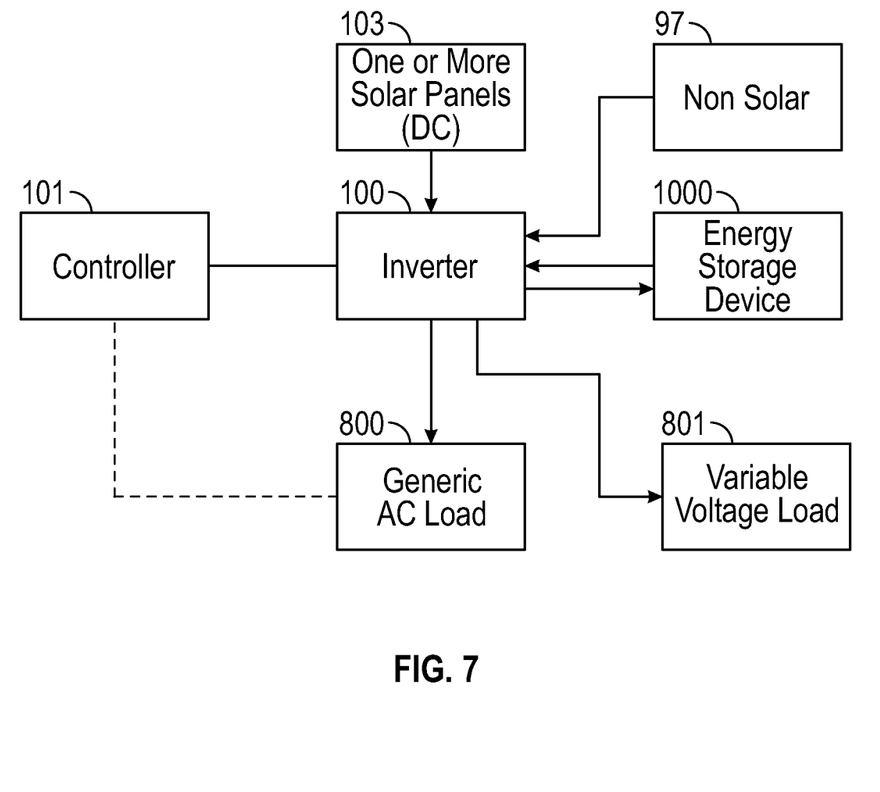
FIG. 7 shows an embodiment of storing power for use later to assist with power surges.

FIG. 7 shows an embodiment where a battery, capacitor, or other energy storage device 1000 has its charge maintained by inverter 100 using any excess energy that is available beyond driving its main load 800. When the controller detects that the inverter 100 has no access or limited to power input from solar panels 103, and needs surge power to start load 800, such starting surge power may be supplied by energy storage device 1000 to inverter 100.

Likewise, where load 800 is sent a command from controller 101 to reduce its speed due to input power drop at inverter 100, extra power may be temporarily supplied from storage 1000 to inverter 100 such that inverter 100 can provide transitional power to load 800 so that load 800 has enough time to reduce its power draw.

In a pool application, the system allows solar powered pumping to be successful and save energy even when used with external features such as operated by a pool automation system or manually operated by a user. A pool automation system may operate a motor driven device such as a water feature, a robot cleaner, or other similar device on a certain schedule or based on a set of conditions. When that motor driven device is used, a higher level of water flow may be necessary. In this embodiment, when the controller 101 starts the motor driven device, a signal is processed by the inverter controller 101 to simultaneously enable the AC hybrid connection and set a correct flow speed (lowest possible) at the pump. This minimizes the use of AC power input, if any, in accordance with pump affinity as opposed to arbitrarily switching to a pre-programmed setting.

Another application of this embodiment is used during pool heating. During pool heating, the system may require a higher flow rate. This is different than simply switching to a pre-set pump RPM speed because, by monitoring flow rate, the system can adjust pump flow in real time in response to a preset feature requirement and modify the pump speed in response to changes in pressure drop such as potentially caused by changing filter conditions, other features starting and stopping, ensuring a flow rate as specified by the feature manufacturer without wasting energy and without pumping any faster than needed.

In an embodiment where a pool heating or cooling apparatus is used, at least one temperature sensor may be monitored by the system controller.

Further, the system, when further equipped with at least one of a power measuring sensor or water pressure sensor, may log flow and pressure, and in some cases power, to create and store a set of performance maps or curves where the system may use such maps or curves to determine best-efficiency points for various operational states or as a means to establish a "starting point" to immediately target a flow rate or pump speed then adjust same based on feedback from a flow meter.

Figure 8:
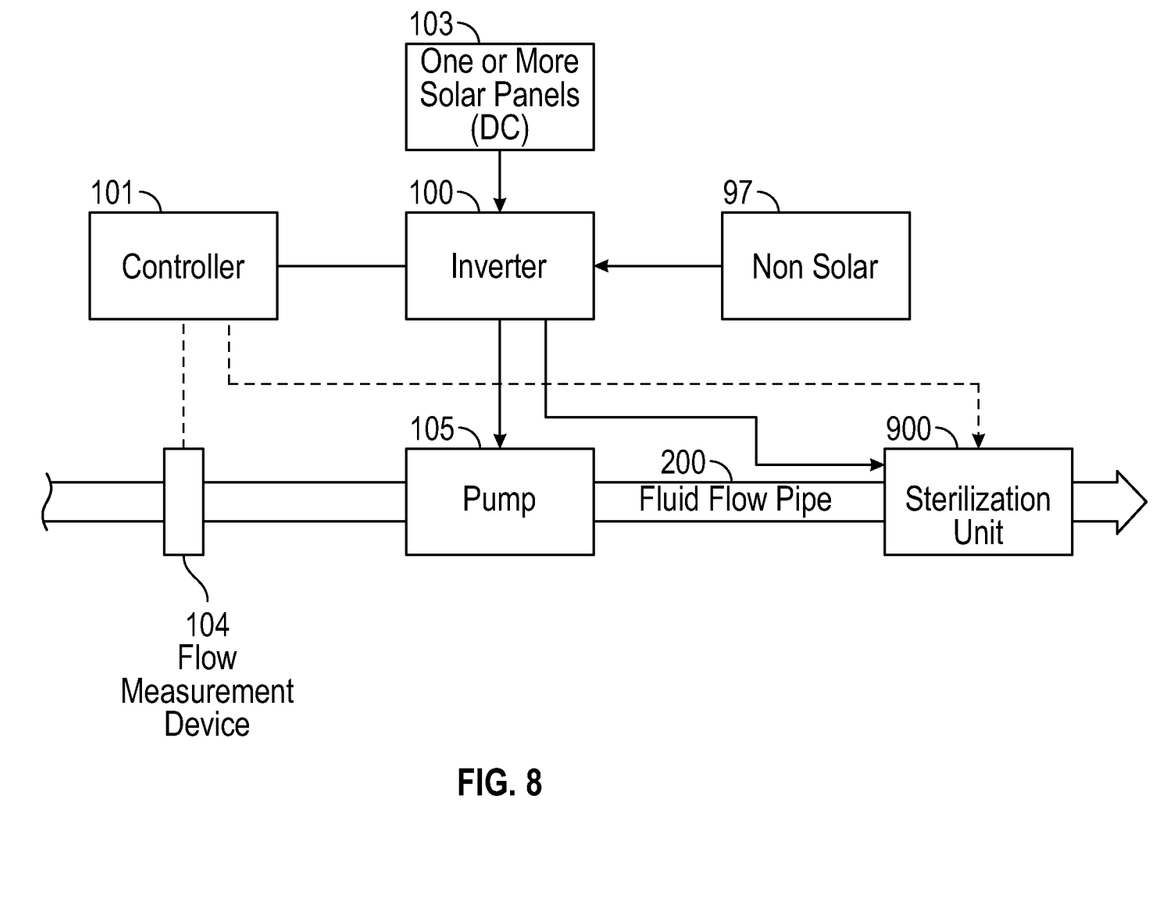
FIG. 8 shows an embodiment where a water treatment or sterilization unit uses variable power to maximize the use of solar energy.

FIG. 8 shows an embodiment where a water treatment or sterilization unit 900 is driven in a way to maximize the use of solar energy. The output of treatment device 900 may be increased during higher flow conditions and lowered during lower flow conditions. In this embodiment, the unit 900 receives variable power from inverter 100. It can be noted that in this case, power from inverter 100 may be in a "switched DC" form in one embodiment.

This embodiment includes managing the production rate of this kind of external equipment in response to one or more of a overall set of application requirements, best efficiency model, available power, desired use, scheduling, or limits to the use of AC power when AC input is available.

In a specific embodiment, an active water sterilization device such as a UV sterilizer apparatus, an ozone or oxygen generation device, AOP or other oxidization or radical systems can be controlled in this way. These devices may have a dosage requirement for sterilization includes flow rate of the water as a major factor, although other factors are also considered. In the embodiment of an UVC sterilization system, a certain W/sec dosage is needed for proper operation to meet a specified kill dosage. The total W output of the UVC needed to meet a kill dosage may need to be higher when flow rate (velocity) is higher, and could be lower when flow rate (velocity) is lower.

The embodiment modifies this to use an amount of available solar power to properly allocate output power to two loads for example, a pump, and a UV treatment system, where the required power (output) level of a UV system may be variable according to a flow rate, and where they system can allocate power such that the two loads balance in their output (and input) accordingly.

In other embodiment, the operation of an external device may be one of heating, or chemical injection, or other apparatus whose operation or capacity level may be associated with a flow rate. As another example of such apparatus, a variable capacity water heating system may require a certain minimum or maximum flow rate at when running at a "higher" level of operation and may prefer or require a different minimum or maximum flow rate flow rate when running on a "lower" level.

In certain embodiments, the system is capable of controlling at least one of a flow rate in response to an external requirement, or managing an external devices level of operation in response to an available flow rate, according to operating and other conditions.

For example, it is known that UVC LEDs are efficiently variable in output and last far longer when operated at a lower power level. And with an inherent capability of the system being to output power to operate a variable load in response to one of variable power input, or to requirements associated with a variable flow, power to one or more UVC LEDs may be applied variably in response to available power, or to a flow rate. Depending on the geometry of the UVC device, velocity of the flow etc., the W output (and therefore input) of the LED to achieve a proscribed "kill rate" will be calculated and can be targeted based on a flow rate. Likewise, in the case of standard UVC lamps which do not respond well to variable power, controlling the number of lamps, from an array of lamps, that are lit can offer varying levels of applied power to be applied based on available power, or a variable power to the lamps based on a flow rate and in conjunction with affinity law.

Further capabilities of the system are limited only by the imagination, a skilled practitioner, or even an end-user may create additional applications and features of the system.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for controlling an electric operated load to maximize use of solar power, comprising:
    a connection to a source of solar power, and a second connection to a secondary source of power other than solar power;
    a controller that establishes a goal for a load, the goal requiring electric power being used by the load to carry out the goal,
    the controller connected to receive an indication of an amount of solar power available from the source of solar power,
    the controller operating for allocating an available solar power such that during a time of solar power being available, the controller automatically controls the load to receive the solar power to operate at a maximum available output based on the solar power, and
    during a time when the solar power is not available, the controller connecting the load to the secondary source of power, and adjusting an amount of output of the load, to meet the goal using the secondary source of power, prior to a next time that solar power will be available, based on an amount of operation that was carried out while the solar power was being used.

2. The system as in claim 1, wherein the goal is a volumetric goal, and the load is a pump, and the controller operates to operate the pump at maximum output while the solar power is available,
    further comprising a flow sensor, sensing an amount of flow from the pump, and where the controller uses the flow sensor to determine a volume that has been pumped by the pump during the time the solar power has been available, and determines a shortfall between the volumetric goal and the volume that has been pumped, and
    drives the pump using the secondary source of power to efficiently operate to complete the shortfall in a remaining time before the next time that solar power will be available.

3. The system as in claim 2, wherein the controller drives the pump to operate at a minimum speed necessary when connected to the secondary source of power to complete the shortfall in a remaining time before the next time that solar power will be available.

4. The system as in claim 2, wherein the goal is a total amount of water pumped for a pool per day.

5. The system as in claim 2, wherein the goal is a goal to keep a tank filled to a first specified amount during solar hours, and to at least one other specified level during non-solar hours.

6. The system as in claim 1, wherein the controller also determines times during which solar power is sufficient to operate the load.

7. The system as in claim 1, further comprising a fill level sensor, which senses a level of a tank, wherein the goal is a desired fill level of the tank, which is set to a first fill level at times when solar power is available, and is set to at least one other specified fill level at times when solar power is not available.

8. The system as in claim 1, where the load is a compressor based refrigeration system, and the goal is to perform as much work as can be done using the amount of solar power.

9. The system as in claim 1, where the load is a pump filling a storage tank, and the goal is a pressure goal, to pressurize the storage tank.

10. The system as in claim 1, wherein the load includes a first load which requires a certain minimum amount of power, and a second load which does not require the minimum amount of power, and where the controller automatically determines whether the amount of solar power is sufficient to operate the first load, and if so switches a switch to control the first load, and if not switches, switches the switch to provide the solar power to the second load.

11. The system as in claim 10, wherein the first load is an AC motor, and the second load is a device that can operate with variable level voltages.

12. The system as in claim 1, further comprising a power storage device, which stores excess power beyond that needed to operate the load, and supplies the power to the load during the time when energy input to the load is changed.

13. The system as in claim 12, wherein the load is a water heating or cooling apparatus.

14. The system as in claim 1, wherein the load includes a pump and an auxiliary load whose power requirements are variable according to a flow rate of the pump, and where the controller allocates power between the pump and the auxiliary device based on the flow rate of the pump.

15. The system as in claim 14, wherein the auxiliary load is a sterilizer, and an output level of the sterilizer is maintained at a level to provide a specified kill rate for a specified flow speed of the pump.

16. The system as in claim 2, wherein the system receives an input from an external system to satisfy a time period volumetric goal beyond an amount that can be accomplished by solar only, and the system enables secondary power, from the secondary source of power, to be blended with all of the available solar power, such that the combined power operates the pump at a speed which meets the any time period volumetric goals as required by the input from the external system.

17. A method of controlling an electric operated load to maximize use of solar power, comprising:

using a computerized device for establishing a goal for a load, the goal requiring electric power being used by the load to carry out the goal, receiving an indication of solar power available from a solar panel, in the computerized device, using the computerized device for allocating available solar power such that during a time of solar power being available, automatically controlling the load to receive the solar power to operate at a maximum available output based on the solar power, and during a time when the solar power is not available, connecting to a secondary source of power, and using the computerized device for adjusting an amount of output of the load, to meet the goal prior to a next time that solar power will be available, based on an amount of operation that was carried out while the solar power was being used.

18. The system as in claim 17, wherein the goal is a volumetric goal, and the load is a pump, and the pump is operated at maximum output while the solar power is available, and further comprising sensing an amount of flow from the pump, and using the amount of flow to determine a volume that has been pumped by the pump during the time the solar power has been available, and determining a shortfall between the volumetric goal and the volume that has been pumped, and connecting to the secondary source of power and drives the pump to efficiently operate to complete the shortfall in a remaining time before the next time that solar power will be available.

19. The system as in claim 18, further comprising driving the pump when connected to the secondary source of power to operate at a minimum speed necessary to complete the shortfall in a remaining time before the next time that solar power will be available.

20. The system as in claim 19, wherein the system receives an input from an external system to satisfy a time period volumetric goal beyond an amount that can be accomplished by solar only, and the system enables secondary power, from the secondary source of power, to be blended with all of the available solar power, such that the combined power operates the pump at a speed which meets the any time period volumetric goals as required by the input from the external system.

* * * * *